United States Patent [19]

Stone

[11] Patent Number: 4,813,910

[45] Date of Patent: Mar. 21, 1989

[54] REACH ADJUSTABLE STEERING COLUMN

[75] Inventor: Jeffrey V. Stone, Ashford, Australia

[73] Assignee: Tubemakers of Australia Limited, Adelaide, Australia

[21] Appl. No.: 101,178

[22] PCT Filed: Nov. 25, 1986

[86] PCT No.: PCT/AU86/00360

§ 371 Date: Jul. 29, 1987

§ 102(e) Date: Jul. 29, 1987

[87] PCT Pub. No.: WO87/03258

PCT Pub. Date: Jun. 4, 1987

[30] Foreign Application Priority Data

Nov. 25, 1985 [AU] Australia .............................. PH 3554

[51] Int. Cl.⁴ ............................ B62D 1/18; F16C 3/03
[52] U.S. Cl. ......................................... 464/162; 74/493
[58] Field of Search ................... 74/492, 493; 403/359; 464/162

[56] References Cited

U.S. PATENT DOCUMENTS

| | | | |
|---|---|---|---|
| 3,369,425 | 2/1968 | Runkle et al. | 464/162 X |
| 3,399,549 | 9/1968 | Nagele | 464/162 X |
| 3,473,406 | 10/1969 | Runkle | 464/162 X |
| 3,545,299 | 12/1970 | Scherenberg | 74/492 |
| 3,922,928 | 12/1975 | Kester | 464/162 X |
| 4,106,311 | 8/1978 | Euler | 464/162 X |

Primary Examiner—Daniel P. Stodola
Attorney, Agent, or Firm—J. Harold Nissen

[57] ABSTRACT

An axially movable column having torque transmitting inner and outer relatively axial movable telescopic shafts. The inner shaft has a cylindraceous outer shape with at least one large flat surface and the outer shaft has a bore therethrough with a corresponding cylindraceous inner surface and at least one flat corresponding to the flat on the inner shaft. The outer shaft has a first portion with a substantially circular cross-section and a second portion with a substantially non-circular cross-section and provided with an anti-lash mechanism in which the outer shaft at its end or an extension thereof is torsionally displaced so that a torsional pre-load is applied to the inner shaft by cooperation of the large flat surfaces. The anti-lash device includes a torque tube welded to an outer portion of the outer shaft at the first and third portions to surround and extend beyond the cylindraceous shape of the outer shaft, and the torque tube has a corresponding cylindraceous bore for engaging the inner shaft, and the tube is welded in such a manner that it applies a pre-load in a torsional sense between the inner and the outer shafts on the large flat surfaces.

13 Claims, 2 Drawing Sheets

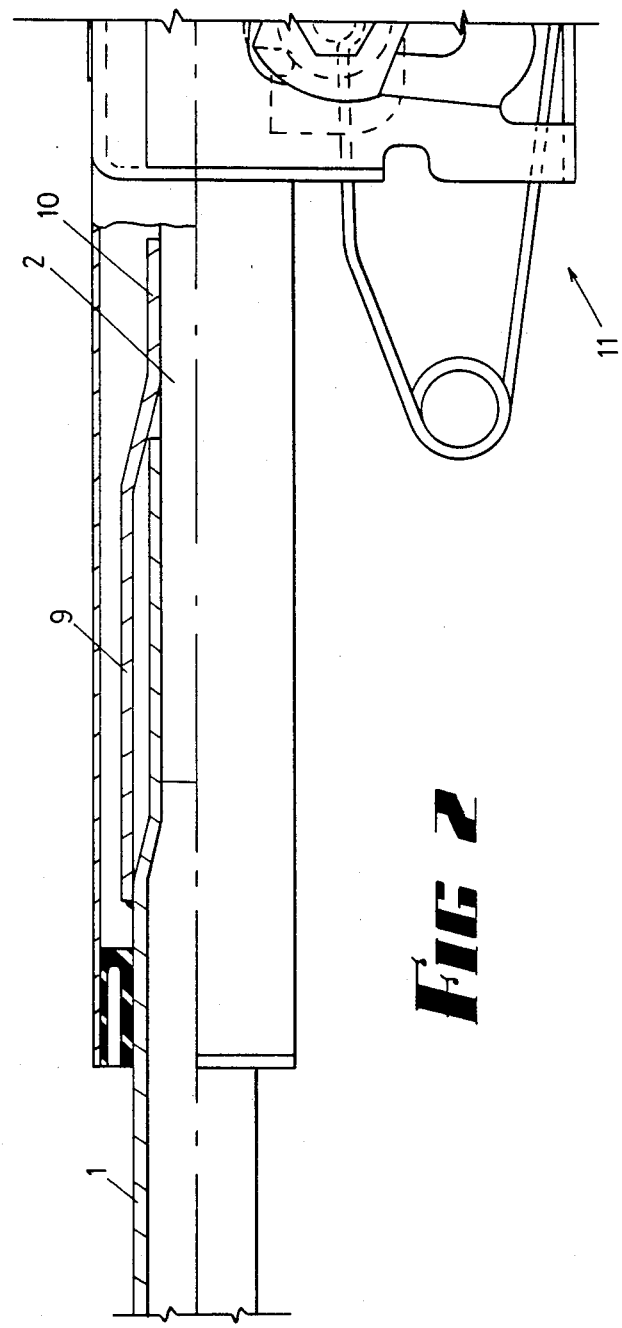

REACH ADJUSTABLE STEERING COLUMN

This invention relates to a reach adjustable steering column having two telescoping shafts, more particularly to the elimination of the rotational lash between the two telescoping shafts.

In such steering columns the two telescoping shafts comprise a first shaft of cylindraceous shape and a second corresponding cylindraceous bore for receiving the first shaft.

BACKGROUND OF THE INVENTION

It is known to provide a lash free axially collapsible steering column by providing a plurality of spring loaded members located in one of the shafts which abut polygonal surfaces of the other shaft to eliminate torsional lash therebetween. This spring loading can be by spring loaded balls, or by utilizing a coil spring, a rubber block or other resilient member in a blind bore behind a ball or cylindrical roller.

In Australian Pat. No. 429,180 the lash is eliminated by balls press-fitted into corresponding bores in one of the shafts, there being provided a rotationally flexible section between these balls and a fail-safe portion, which fail-safe portion becomes operative at torque levels above a predetermined value.

The embodiments also show examples where either the inner hex shaft is twisted or the outer tube is twisted to provide a pre-load, there still being provided a torsional fail-safe portion in the inner hex shaft.

However, with the invention to Australian Pat. No. 429,180 it is apparent that due to the hex shaft, and the outer tube of corresponding shape that the load applied is virtually a point loading at the apices of the hex shaft.

In order to eliminate indentation of the tube and/or rounding or other deforming of the apices of the hex shaft the torsional fail shaft portion is required which then transfers the torque to the other end of the hex shaft where the excess torque is transmitted.

It is an object of this invention to provide a lash axially adjustable steering column in which the column is simple and economic to produce and which does not require a fail-safe portion.

BRIEF STATEMENT OF THE INVENTION

Thus, there is provided according to the invention, an axially movable column comprising torque transmitting inner and outer relatively axially movable telescopic shafts, said inner shaft having a cylindraceous shape with at least one large flat surface and said outer shaft having a corresponding bore therein with a cylindraceously-shaped inner surface for receiving said inner shaft characterized by anti-lash means comprising a tube welded or otherwise attached to said outer shaft and having a corresponding polygonal bore for engaging said inner shaft, said tube being welded in a manner that it applies a pre-load in a torsional sense between the inner and outer shafts on the large flat surfaces thereof.

In a further form of the invention the anti-lash means can comprise that the outer shaft at its end or an extension thereof is torsionally displaced to provide a pre-load to the inner shaft.

BRIEF DESCRIPTION OF THE DRAWINGS

In order to more fully describe the invention reference will now be made to the accompanying drawings in which:

FIG. 2 is an alternative form of the invention.

DESCRIPTION OF THE PREFERRED EMBODIMENT

Figure 1:
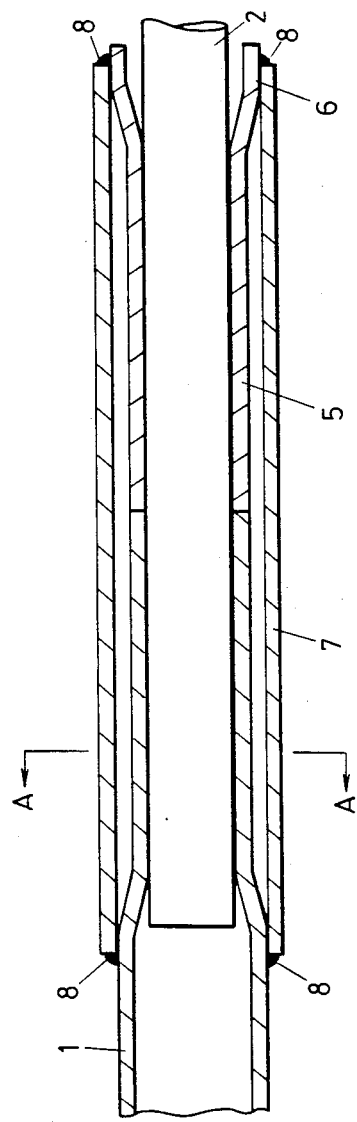
FIG. 1 is a longitudinal cross-sectional view of one form of the invention.
Figure 1A:
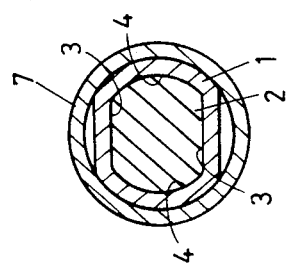
FIG. 1a is a view along the lines A—A of FIG. 1.

Referring to FIGS. 1 and 1a of the drawings, the tube shaft 1 is shown, this tube extending downwardly to the steering box or mechanism, and slidable within this tube shaft is a solid shaft 2 which extends upwardly to which is affixed the steering wheel.

Preferably the shaft 2 is of the shape as shown in FIG. 1a having a pair of opposite flats 3 and arcuate joining portions 4.

The shaft tube 1 is cylindrical, but at its upper end is formed to have a complimentary shape to the shaft 2 as shown in FIG. 1a.

According to this form of the invention, there is provided a continuation of the tube 1 as a separate portion 5, this abutting the end of the shaft tube 1 and is expanded at its upper end to a circular portion 6.

The extension portion 5 is formed to have a shape complimentary to the shaft 2, and the shaft tube 1 and the extension portion 5 are joined by a torque tube 7, the torque tube 7 being attached as by welding 8 to the tube shaft 1 and the extension portion 5.

The torque tube 7 is welded first to the extension portion 5 and then torque is applied to the torque tube 7 and the weld 8 applied between the torque tube 7 and the tube shaft 1 while being restrained to thus very slightly offset the extension portion 5 in a rotational sense from the torque tube 7.

The shaft 2 is subject to this pre-load applied between the extension portion 5 and to the torque tube 7.

The pre-load chosen is such that the shaft 2 can still slide within the tube shaft 1 and the extension 5 but the pre-load by being applied to the flats of the shaft 2 effectively eliminates any back lash.

Due to the fact that the pre-load is applied to the large area of flats on the shaft 2 torque in the steering motion can be applied without any risk of any indentation or deformation occurring on either component.

Referring now to FIG. 2 the tube shaft 1 is again at its upper end formed to be complimentary to the shape of the shaft 2, and in this embodiment the torque tube 9 is again welded to the tube shaft 1, but this torque tube 9 is deformed at its upper end 10 to have an internal shape complimentary to the shaft 2. In this instance pre-load is again applied by applying torque to the torque tube 9 and restraining it in its pre-stressed condition before the turque tube 9 is welded to the shaft 1. The mechanism generally indicated at 11 is the locking mechanism for locking the shaft 2 in its position when the desired extension has been achieved by the driver of the vehicle.

Thus, it will be seen according to the invention, that while the preferred shape of the shaft 2 is shown, other shapes can be provided as long as there are large bearing surfaces for the pre-load to be applied and without causing indentation or deformation of either of the complimentary parts. As the co-operating parts have co-operating large bearing surfaces, the pre-load is distributed across these surfaces, there being no concentrated or point bearing areas which could result in indentation of one or both of the co-operating surfaces.

By the invention it will be seen that the complimentary components are able to withstand all torque which is applied to the steering column without there being any need for a flexible portion and a fail-safe portion.

While the invention has been particularly described in relation to the steering columns of a motor vehicle, it is to be realised that the invention is not to be limited thereto, but is applicable to any situation requiring a pair of telescopic shafts adapted to transmit torque.

Although various embodiments have been described in some detail it is to be realised that the invention is not to be limited thereto but may include various modifications falling within the spirit and scope of the invention.

The claims defining the invention are as follows:

1. An axially movable column comprising:
torque transmitting inner and outer tubular relatively axial movable telescopic shafts, said inner shaft having a cylindraceous outer shape with at least one large flat surface and said outer shaft having an inner surface portion having a corresponding cylindraceous inner surface with at least one flat corresponding to said at least one flat on said inner shaft, said outer shaft having a first portion having a substantially circular cross-section and a second portion having a substantially noncircular cross-section and including said inner surface portion, said second portion being provided with anti-lash means comprising the outer shaft at its end, or an extension thereof being torsionally displaced so that a torsional pre-load is applied to the inner shaft by cooperation of the large flat surfaces thereof;
said anti-lash means comprising a torque tube welded to an outer portion of said outer shaft at said first portion to surround and extend beyond said cylindraceous shape of said outer shaft;
said torque tube having an extension portion with a corresponding cylindraceous bore for engaging said inner shaft, and the tube being welded in such a manner that it applies a pre-load in a torsional sense between said inner and said outer shafts on the large flat surfaces thereof.

2. An axially movable column as defined in claim 1, wherein said torque tube is a two-part tube comprising an outer tube part welded to said outer shaft and said extension portion having a corresponding cylindraceous bore, said extension portion being welded to said outer tube part while said outer tube part has torque applied thereto.

3. An axially movable column as defined in claim 2, wherein said outer tube part extends axially from said outer shaft, and said inner shaft is situated within said outer tube part, said extension portion and outer tube part being welded at their adjacent ends.

4. An axially movable column as defined in claim 1, wherein said torque tube is welded to said outer shaft at a point spaced from the end of the outer shaft with said torque tube extending over the cylindraceous shape of the outer shaft, said torque tube extending beyond the end of the outer shaft and being shaped at its end to form said extension portion with a corresponding cylindraceous shape to engage the said inner shaft, the torque tube being welded to the outer shaft while torque is applied thereto to provide the desired preload.

5. An axially movable column as defined in claim 1, wherein said cylindraceous shape has a pair of opposite flats joined by arcuate portions.

6. An axially movable column as defined in claim 1, wherein said inner shaft has a pair of outer diametrically opposite flats joined by a pair of arcuate portions.

7. An axially movable column as defined in claim 6, wherein said extension portion has a pair of inner diametrically opposed flats joined by a pair of arcuate portions.

8. An axially movable column as defined in claim 6, wherein said inner surface portion has a pair of inner diametrically opposed flats joined by a pair of arcuate portions.

9. An axially movable column as defined in claim 8, wherein said torque tube includes two portions, a first portion having a cylindrically-shaped inner portion and a second portion defined by said extension portion having one end abutting the other end of said first portion and having an inner surface configuration conforming to said inner shaft.

10. An axially movable column as defined in claim 9, wherein said second portion is first welded to said torque tube and then said first portion is welded to said outer shaft after torque is applied thereto while said first portion is restrained to offset said second portion in a rotational sense.

11. An axially movable column as defined in claim 1, wherein said torque tube has said extension portion integrally formed or one end with an inner circumferential surface complementary to the outer cylindraceous shape of said inner shaft, and another end with an inner surface having a substantially cylindrical shape.

12. An axially movable column as defined in claim 11, wherein said second portion of said outer shaft extends into said outer end of said torque tube and contacts the inner surface of said one end of said torque tube, and said torque tube being welded to the outer surface of said outer shaft at said other end thereof after said torque tube is deformed at its said one end to provide the internal shape thereof complementary to the outer surface of said inner shaft, said torque tube being maintained in a prestressed condition prior to the welding of said torque tube to said outer shaft.

13. An axially movable column as defined in claim 1, wherein the outer portion of said inner shaft is in direct contact with the inner cylindraceous surface portion of said outer shaft.

* * * * *